United States Patent
Stephenson et al.

(10) Patent No.: US 9,456,548 B2
(45) Date of Patent: Oct. 4, 2016

(54) CONVEYER FOR A MATERIAL PROCESSING MACHINE

(71) Applicant: Deere & Company, Moline, IL (US)

(72) Inventors: Roger D. Stephenson, Ottumwa, IA (US); Allan W. Rosenbalm, Blakesburg, IA (US)

(73) Assignee: DEERE & COMPANY, Moline, IL (US)

( * ) Notice: Subject to any disclaimer, the term of this patent is extended or adjusted under 35 U.S.C. 154(b) by 28 days.

(21) Appl. No.: 14/180,428

(22) Filed: Feb. 14, 2014

(65) Prior Publication Data

US 2015/0230406 A1    Aug. 20, 2015

(51) Int. Cl.
  *A01D 61/00*  (2006.01)
  *A01D 41/14*  (2006.01)

(52) U.S. Cl.
  CPC .......... *A01D 61/002* (2013.01); *A01D 61/008* (2013.01); *A01D 41/14* (2013.01)

(58) Field of Classification Search
  CPC .................. A01D 61/00–61/04; A01D 41/14; A01F 12/22; A01F 29/00–29/22
  See application file for complete search history.

(56) References Cited

U.S. PATENT DOCUMENTS

| | | | | |
|---|---|---|---|---|
| 329,062 A * | 10/1885 | Miller | ..................... | B65G 15/42 198/699 |
| 768,471 A * | 8/1904 | Mack | ..................... | A01D 61/008 460/78 |
| 1,219,927 A * | 3/1917 | Dibbets | ..................... | B29C 43/22 100/176 |
| 1,435,600 A * | 11/1922 | Marker | ..................... | A01D 61/02 198/699 |
| 2,476,265 A * | 7/1949 | Peterson | ..................... | A01D 61/008 198/513 |
| 2,849,103 A | 8/1958 | Scheffter et al. | | |
| 3,282,408 A | 11/1966 | Lohrentz | | |
| 3,682,400 A * | 8/1972 | Smith | ..................... | B27L 11/02 241/278.1 |
| 3,967,719 A * | 7/1976 | Kloefkorn | ..................... | A01D 61/008 198/550.12 |
| 4,061,284 A * | 12/1977 | Raisbeck | ..................... | A01F 29/06 241/222 |
| 4,257,566 A * | 3/1981 | Lawrence | ..................... | B02C 18/186 241/221 |
| 4,282,703 A * | 8/1981 | Wilson | ..................... | A01F 12/10 460/16 |
| 4,300,333 A * | 11/1981 | Anderson | ..................... | A01D 61/008 198/666 |
| 4,453,375 A * | 6/1984 | Field | ..................... | A01D 89/002 56/14.6 |
| 4,495,755 A * | 1/1985 | Johnson | ..................... | A01D 41/10 198/698 |
| 4,539,801 A * | 9/1985 | Field | ..................... | A01D 61/008 198/613 |
| 4,581,880 A * | 4/1986 | Klinner | ..................... | A01D 43/10 56/364 |
| 4,796,645 A * | 1/1989 | Kuchar | ..................... | A01F 12/20 460/107 |
| 4,972,665 A * | 11/1990 | Hicks | ..................... | A01D 61/008 198/518 |
| 5,005,343 A * | 4/1991 | Patterson | ..................... | A01D 57/20 56/14.4 |
| 5,478,277 A * | 12/1995 | Kloefkorn | ..................... | A01D 61/04 460/114 |

(Continued)

*Primary Examiner* — Alicia Torres
*Assistant Examiner* — Adam Behrens (57) ABSTRACT

A material processing machine includes a rotary conveyer for delivering material to a material conditioner. The conveyer has a rotatable body and a paddle is mounted on the body. The paddle includes a support portion having a radially outer end and a radially inner end which is attached to the body. The outer end is not ahead of the inner end with respect to a direction of rotation of the body. The paddle also includes a lip portion which is supported by the support portion. The lip portion is forward or advanced with respect to the outer end of the support portion, with respect to the direction of rotation of the body.

17 Claims, 6 Drawing Sheets

(56) References Cited

U.S. PATENT DOCUMENTS

| | | | | |
|---|---|---|---|---|
| 5,544,826 A * | 8/1996 | Klingler | A01F 29/095 | 241/242 |
| 5,941,469 A * | 8/1999 | Spiegemacher | A01F 29/095 | 241/291 |
| 5,980,383 A * | 11/1999 | Medley | A01D 61/008 | 460/114 |
| 6,074,297 A * | 6/2000 | Kuchar | A01F 12/20 | 460/46 |
| 6,093,099 A * | 7/2000 | Groff | A01D 61/008 | 460/32 |
| 6,922,983 B2 * | 8/2005 | Gryspeerdt | A01D 61/008 | 198/550.12 |
| 7,201,652 B2 * | 4/2007 | Van De Sluis | A01F 12/10 | 460/16 |
| 7,213,781 B2 * | 5/2007 | Pakura | A01D 43/08 | 241/221 |
| 7,322,175 B2 * | 1/2008 | Ferre | A01D 82/02 | 241/294 |
| 7,454,888 B2 | 11/2008 | Barnett | | |
| 7,458,198 B2 * | 12/2008 | Eubanks | A01D 82/02 | 56/16.4 R |
| 7,543,428 B1 * | 6/2009 | Puryk | A01D 57/20 | 430/127 |
| 7,771,261 B2 * | 8/2010 | Schlesser | A01F 12/40 | 460/71 |
| 2002/0174636 A1 * | 11/2002 | Calmer | A01D 61/008 | 56/14.5 |
| 2004/0250523 A1 * | 12/2004 | Schulz | A01F 12/10 | 56/153 |
| 2005/0109001 A1 * | 5/2005 | Wolters | A01D 57/22 | 56/16.4 R |
| 2006/0079307 A1 * | 4/2006 | Van De Sluis | A01F 12/10 | 460/16 |
| 2008/0167101 A1 * | 7/2008 | Farley | A01F 12/22 | 460/72 |
| 2009/0143120 A1 * | 6/2009 | Pope | A01F 12/18 | 460/13 |
| 2011/0232249 A1 * | 9/2011 | McIlwain | A01D 89/005 | 56/16.4 R |
| 2014/0141849 A1 * | 5/2014 | Hollatz | A01F 7/02 | 460/80 |

* cited by examiner

CONVEYER FOR A MATERIAL PROCESSING MACHINE

FIELD

The present disclosure relates to a conveyer for a material processing machine.

BACKGROUND

Certain material processing machines, such as crop harvesters and windrowers, include a rotary crop conveyer which delivers crop from a cutterbar to conditioning elements. Hesitation of the crop or material between the cutting element and conditioning elements in a hay cutting platform results in uneven feeding of crop. This uneven feeding causes crop damage from recut crop with rotary cutterbars. Recut crop forms a dense wad in the resulting windrow that leads to poor local air circulation. This results in localized areas of high moisture within the windrow which results in lower quality bales or forage, often with mold in the wet areas.

Uneven feeding also causes poor conditioning quality and uneven windrows, for both rotary and sickle cutterbars. Because of the uneven feeding, the conditioner sees large clumps of crop followed by thin mats. This results in non-uniform conditioning of the crop and bunchy windrows. The resulting windrow does not dry uniformly, leading to a reduction in hay or forage quality. Uneven windrows also make it difficult for the following machine to process the windrow. This is especially true in the case of forage harvesters which have a noticeable decrease in capacity in uneven windrows.

In some cases it is desirable to run an auger at a different tip speed than the conditioner. In cases where the conditioner tip speed runs faster than the auger tip speed, the conditioner can grab crop and pull it across the slower moving flight or paddle causing damage to the crop. It is desired to provide an aggressive rotating crop conveying element to prevent crop hesitation and to thereby reduce crop damage and uneven feeding.

SUMMARY

According to an aspect of the present disclosure, a material processing machine includes a rotary conveyer for delivering material to a material conditioner. The conveyer has a rotatable cylindrical body having a center axis of rotation. One or more paddles are mounted on the body. In a first set of embodiments, each paddle has a first member and a second member. The first member has a radially outer end and a radially inner end. The inner end is attached to the body, and, as considered at each point along the length of the cylindrical body, the first member is substantially parallel to a radial line extending through the first member and through the rotation axis of the conveyer. The second member is substantially L-shaped in vertical cross section and is disposed to have an inner or first part and an outer or second part. The outer part is disposed substantially parallel to an outer circumference of the body and is substantially perpendicular to the first member. The outer part is attached to the outer end of the first member and the inner part includes an outer end joined to a trailing end of the outer part and includes an inner end that is attached to the rotatable body at a distance angularly spaced from the inner end of the first member. A leading edge or lip of the outer part of the second member extends beyond the outer end of the first member in the direction of rotation.

The second member is bent to form an inner part and an outer part. The inner part has an inner end attached to the body and spaced apart from the inner end of the first member. The outer part has a first end joined to an outer end of the inner part and has a second end. The outer end of the first member engages the outer part at a position located between the first and second ends of the outer part. The outer part of the second member is located substantially circumferential relative to the axis of the conveyor.

A distance between the inner end of the first member and the inner end of the inner part is greater than a distance between the outer end of the first member and the outer end of the inner part. A radial distance between the body and the second end of the outer part is greater than a radial distance between the body and the first end of the outer part. The second member forms a smoothly curved joint between its inner and outer parts.

In a second set of embodiments, the paddle is a single integral part which has a main body or support portion and an edge or lip portion which is supported by the support portion. The support portion has a radially inner end which is attached to an outer surface of the body. The edge or lip portion is joined to the support portion by a bent or curved portion. The support portion has an outer end which is aligned with or trails the inner end with respect to the direction of rotation of the body. Preferably, the support portion is parallel to the radial line which extends outwardly through the support portion from the rotation axis of the body. The edge or lip portion is formed at an outer end of the bent portion. The edge or lip portion leads is the outer end of the support portion, with respect to the direction of rotation of the body.

DETAILED DESCRIPTION OF THE DRAWINGS

Figure 1:
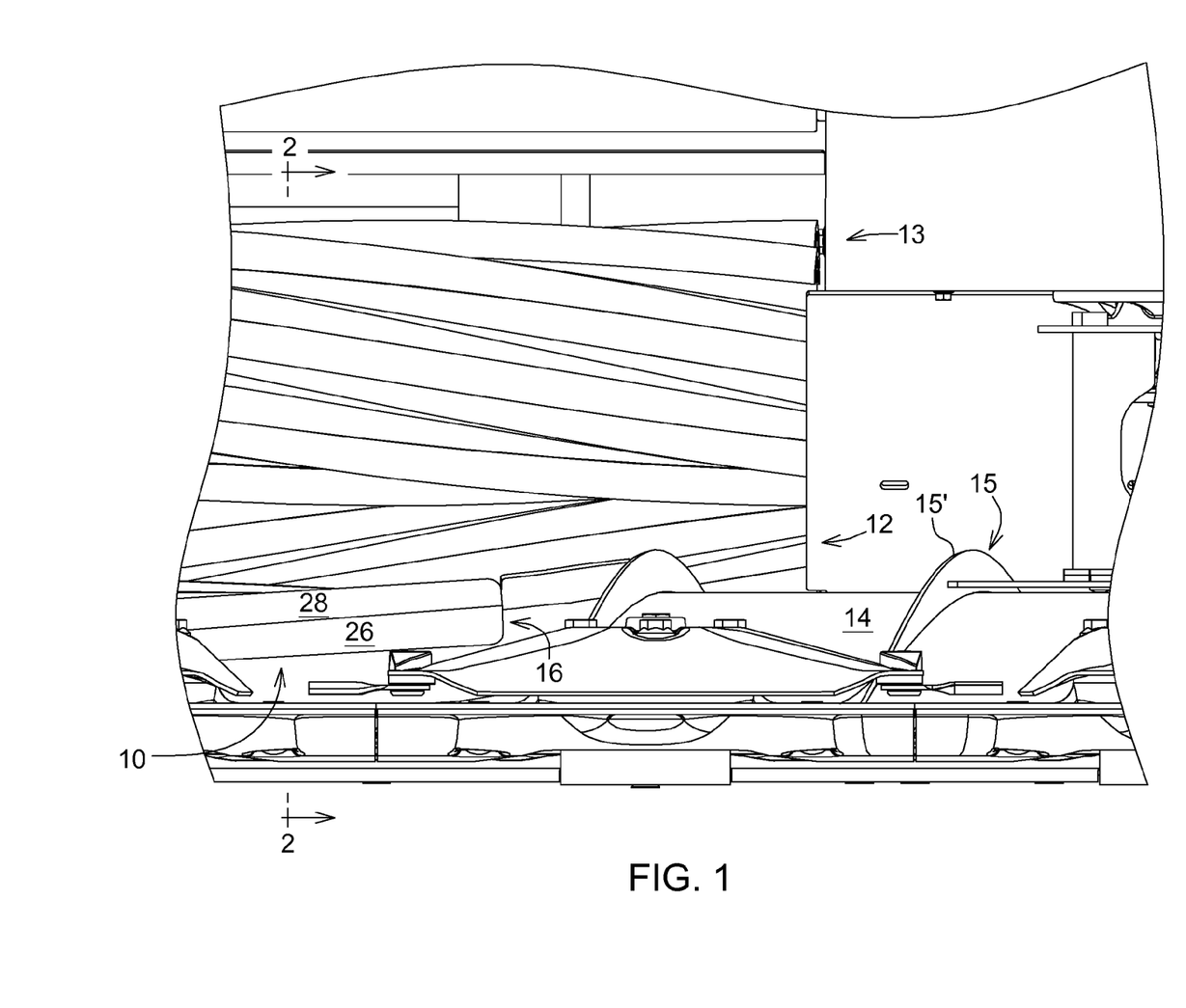
FIG. 1 is a view of a portion of a windrower showing a crop conveyer and crop processing rolls.
Figure 2:
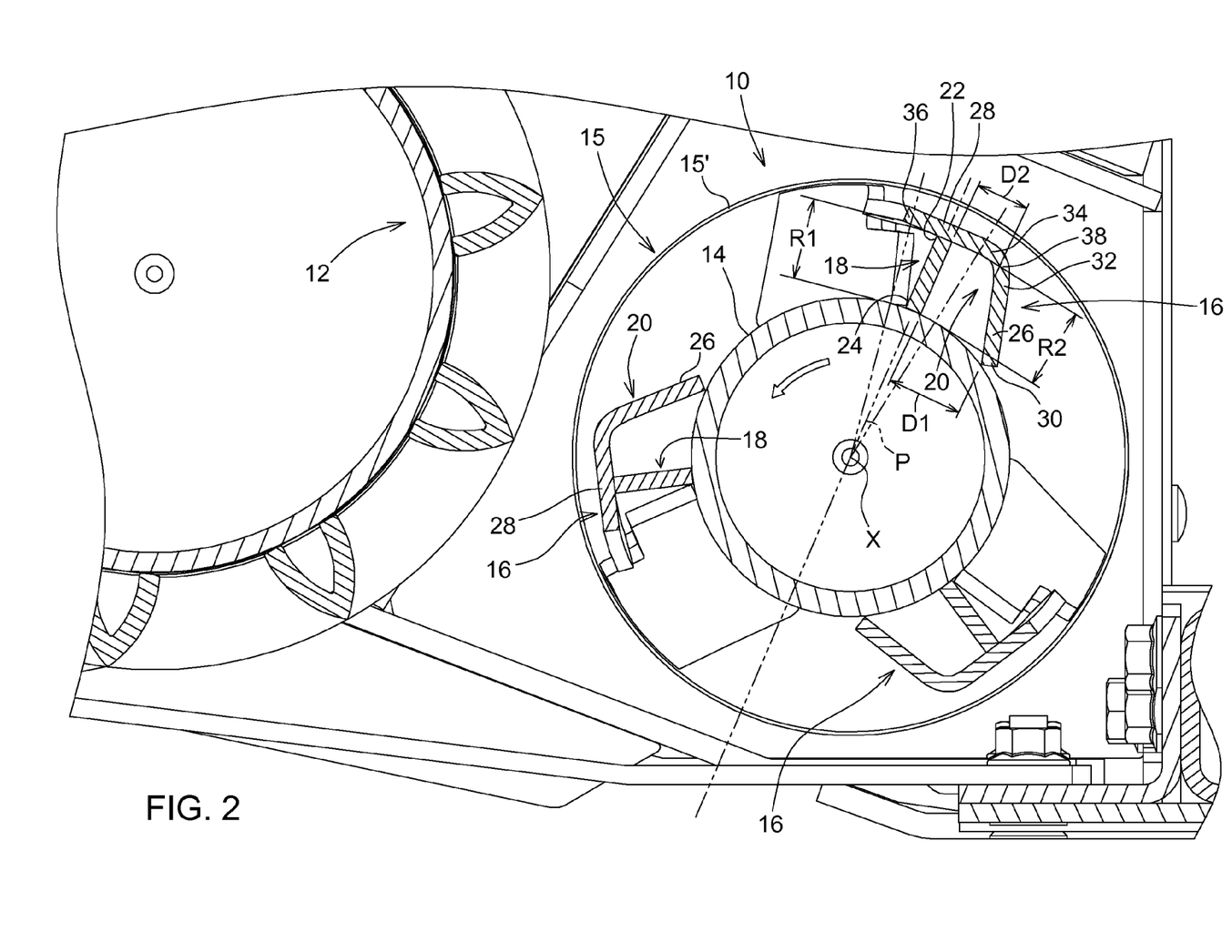
FIG. 2 is an enlarged sectional view along lines 2-2 of FIG. 1.
Figure 3:
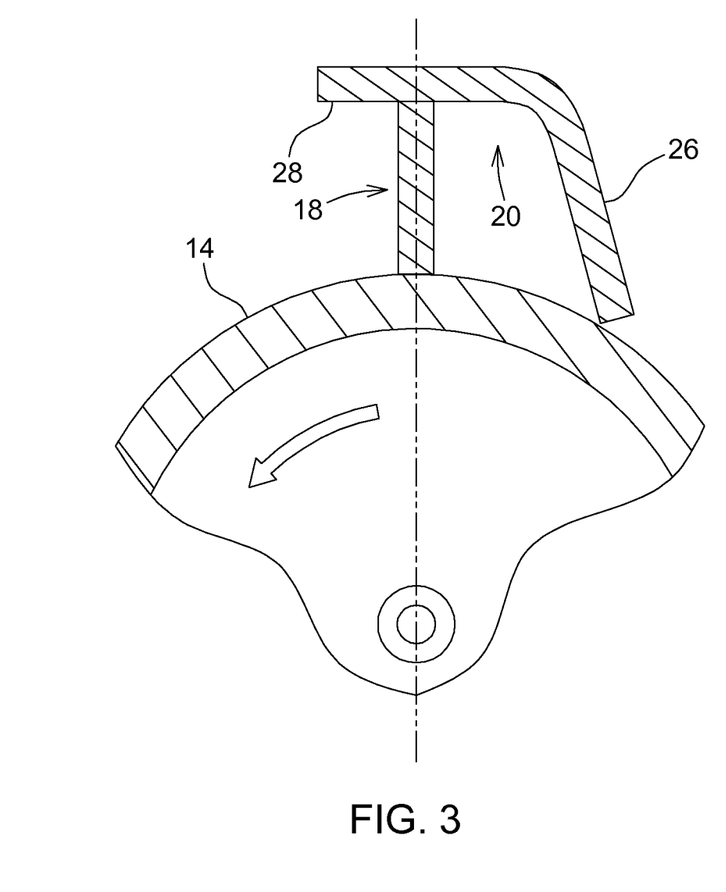
FIG. 3 is an enlarged sectional view of a first alternate embodiment of the paddle design shown in FIG. 2.

Referring to FIG. 1, a material processing machine, such as a windrower, includes a rotary conveyer 10 for delivering material to conditioner rolls 12 and 13. Referring now to FIGS. 2 and 3, the conveyer 10 has a rotatable cylindrical body 14 which rotates counter-clockwise about a rotational axis X, as viewed in FIG. 2. One or a plurality of paddles 16 are attached to the outer surface of the body 14. Conveyer 10 includes a conventional auger 15 which delivers crop to the paddles 16. Preferably, each paddle 16 has a radial height which is slightly less than a radial height of a flight 15' of the auger 15. Having the radial height of the paddle shorter than the radial height of the flight 15' allows the auger 15 to deflect more at the center without contacting the conditioner rolls 12 and 13 than if the paddle were the full height of the auger flight 15'. Alternatively, more space could be provided between the auger and the lower conditioner roll 12. The paddles 16 are elongated and can be helical or axially straight or have other variations of twist along the rotation axis of the body 14.

Each paddle 16, as shown in FIGS. 1 and 2, is helical and is attached to the body 14 with a slight twist. Each paddle 16 includes has a first member 18 and a second member 20. The first member 18 has a radially outer end 22 and a radially inner end 24. The inner end 24 is attached to the body 14, such as by welding. The first member 18, as viewed at any axial location along the body 14, such as the location where the vertical cross section 2-2 is taken, is parallel relative to a radial line which extends through the first member 18 from the rotation axis X of the body 14.

The second member 20 is bent to form an angle member that is generally L-shaped in vertical cross section and having, relative to an outer surface of the body 14, an inner or first part or leg 26 and an outer or second part or leg 28. The inner part or leg 26 has an inner end 30 attached to the body 14, such as by welding. The inner end 30 is spaced apart angularly about the rotation axis of the body 14 in a direction trailing the inner end 24 of the first member 18 relative to a forward direction of rotation of the conveyor 10 indicated by the arrow in FIG. 2. The outer part or leg 28 is spaced radially from, and extends generally parallel to the outer surface of the body 14 and has a first or trailing end 34 joined to an outer end 32 of the inner part 26 and has a second or leading end 36. The outer end 22 of the first member 18 engages and is attached (such as by welding) to the outer part 28 at a position located between the first end 34 and the second end 36 of the outer part 28, with the portion of the outer part or leg 28 located between the outer end of the first member 18 and the second end 36 of the outer part 28 defining a leading lip portion. The second member 20 forms a smoothly curved joint 38 between its inner part or leg 26 and its outer part or leg 28.

A distance D1 between the inner end 24 of the first member 18 and the inner end 30 of the inner part 26 is greater than a distance D2 between the outer end 22 of the first member 18 and the outer end 32 of the inner part 26. A radial distance R1 between the body 14 and the second end 36 of the outer part 28 is greater than a radial distance R2 between the body 14 and the first end 34 of the outer part 28. The distances D1 and D2 are aligned perpendicularly with respect to an axial plane of the conveyer 10.

Preferably, the joint 38 has an outer rounded surface that trails the aggressive edge formed by the second end of the outer part 28. This rounded surface allows crop to be pulled over the trailing surface of the paddle 16 without causing crop damage. This feature allows the conditioner 12 to run with a higher peripheral speed than the conveyer 10 without adversely affecting the crop.

Figure 4:
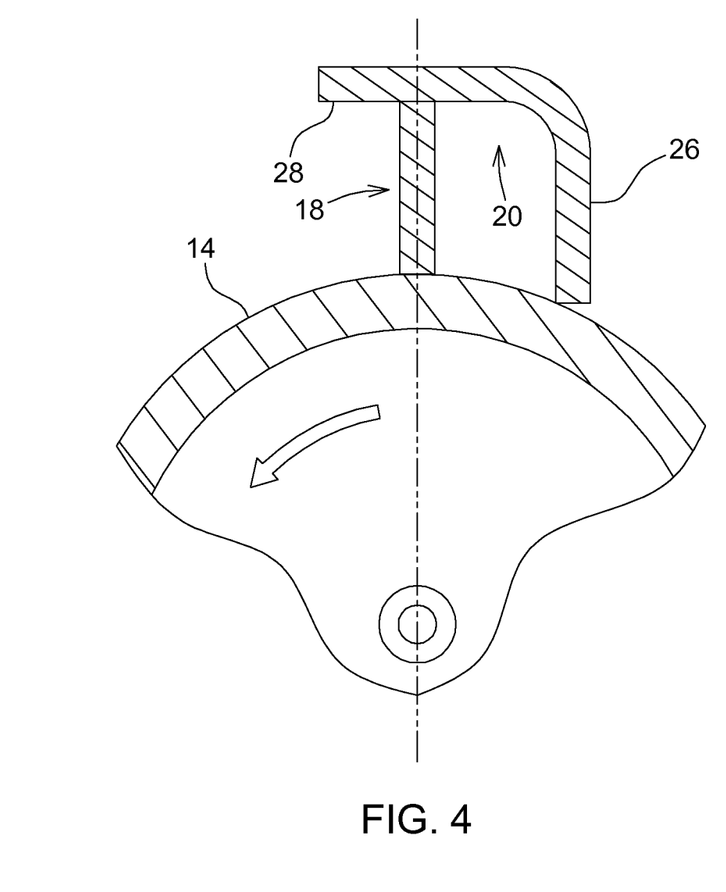
FIG. 4 is an enlarged sectional view of second alternate embodiment of the paddle design shown in FIG. 2.

Referring now to FIG. 4, a second embodiment which is similar to the embodiment of FIGS. 2 and 3 is shown, except that the first part 26 of the second member 20 is substantially parallel to the first member 18. Taken together, FIGS. 2, 3 and 4 show first members 18 wherein the outer end of each first member 18 is located in radial alignment with the inner end and therefore is not advanced with respect to the inner end of the first member in the direction of rotation.

Figure 5:
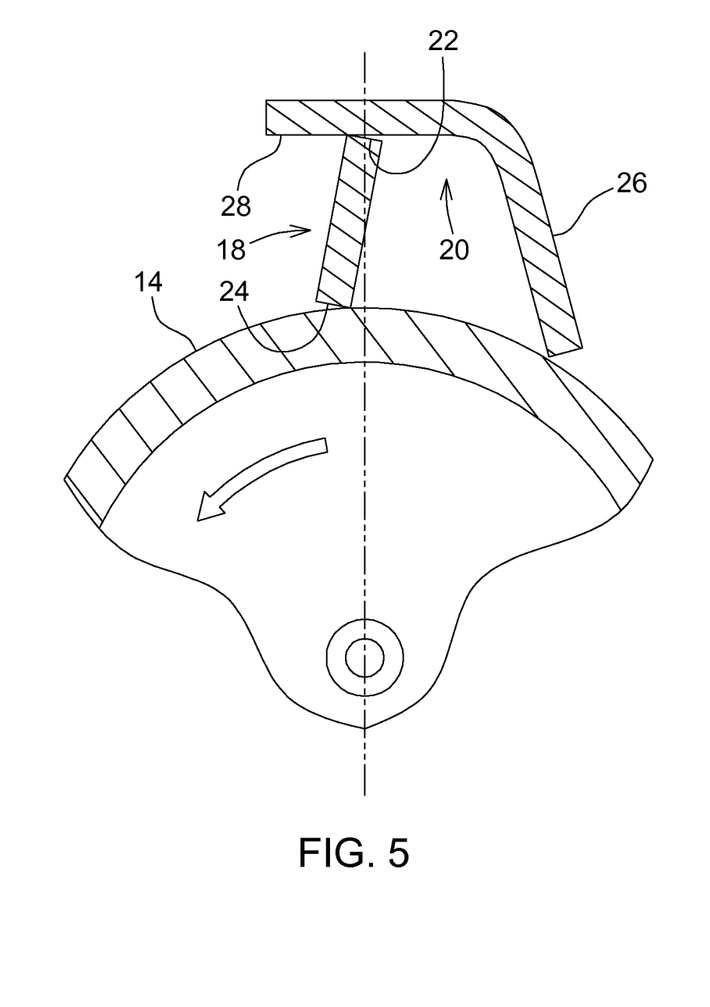
FIG. 5 is an enlarged sectional view of a third alternate embodiment of the paddle design shown in FIG. 2.

Referring now to FIG. 5, a third embodiment which is similar to the embodiment of FIGS. 2 and 3 is shown, except that first member 18 is tilted with respect to the radial line which extends through the first member 18 from the rotation axis X of the body 14. Thus, the inner end 24 of the first member 18 leads, that is to say it is advanced or forward with respect to the outer end 22 of the first member 18 in the direction of rotation.

Figure 6:
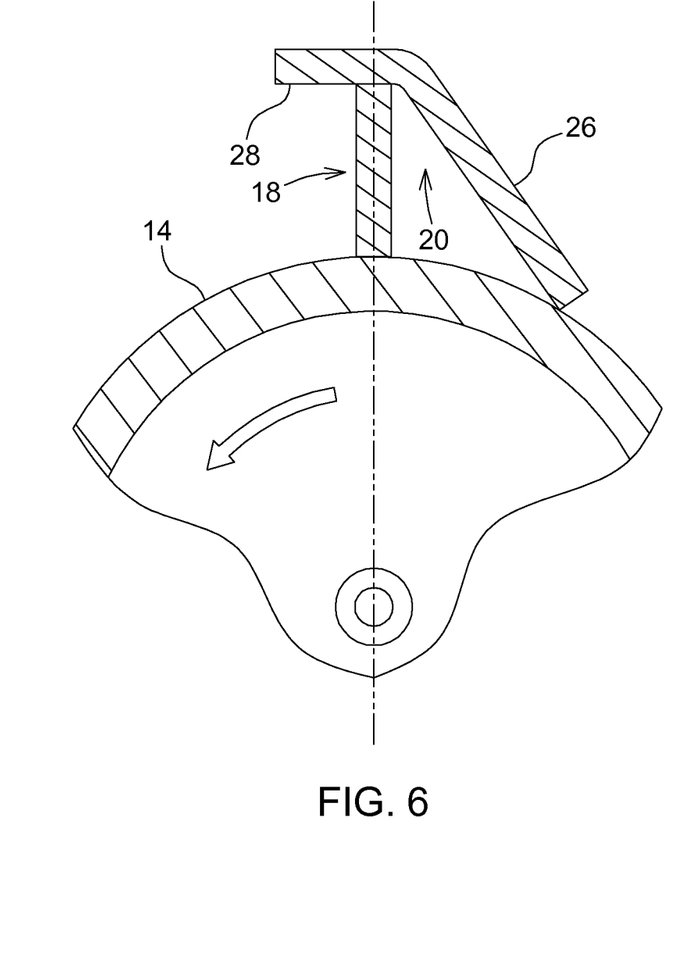
FIG. 6 is an enlarged sectional view of a fourth alternate embodiment of the paddle design shown in FIG. 2.

Referring now to FIG. 6, a fourth embodiment which is similar to the embodiment of FIGS. 2 and 3 is shown, except that the bent part of the second member 20 is adjacent to the outer end 22 of the first member 18. As a result, the outer part 28 of the second member 20 is shorter than in FIGS. 2 and 3.

Figure 7:
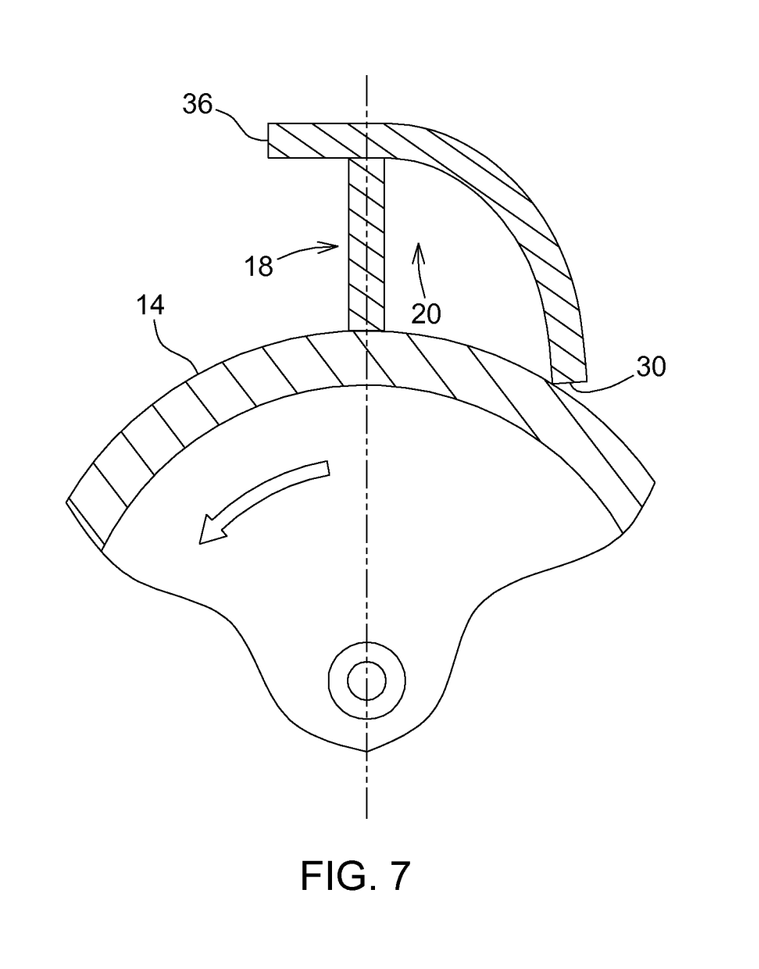
FIG. 7 is an enlarged sectional view of a fifth alternate embodiment of the paddle design shown in FIG. 2.

Referring now to FIG. 7, a fifth embodiment which is similar to the embodiment of FIGS. 2 and 3 is shown, except that the second member 20 is gradually curved between its inner end 30 and its forward end 36.

Figure 8:
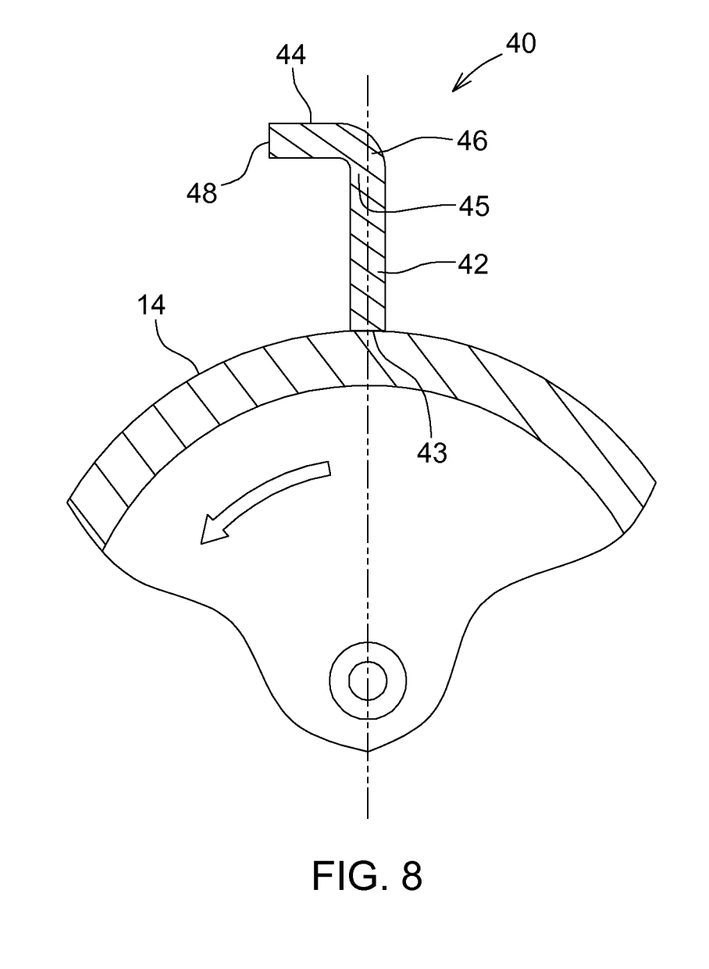
FIG. 8 is an enlarged sectional view of a sixth alternate embodiment of the paddle design shown in FIG. 2.

Referring now to FIG. 8, a sixth embodiment is shown wherein there is no second member and the paddle 40 is a single integral part. The paddle 40 has a main body or support portion 42 and an edge or lip portion 44 which is supported by the support portion 42. Support portion 42 has a radially inner end 43 which is attached to an outer surface of the body 14. Edge or lip portion 44 is joined to support portion 42 by a bent or curved portion 46. The support portion 42 has an outer end 45 which is aligned with or is not ahead of its inner end 43 with respect to the direction of rotation of the body 14. Preferably, the support portion 42 is parallel to the radial line which extends through the support portion from the rotation axis of the body 14. The edge or lip portion 44 is formed at an outer end of bent portion 46. The edge or lip portion 44 is forward or advanced with respect to the outer end 45 of the support portion 42, with respect to the direction of rotation of the body 14.

Figure 9:
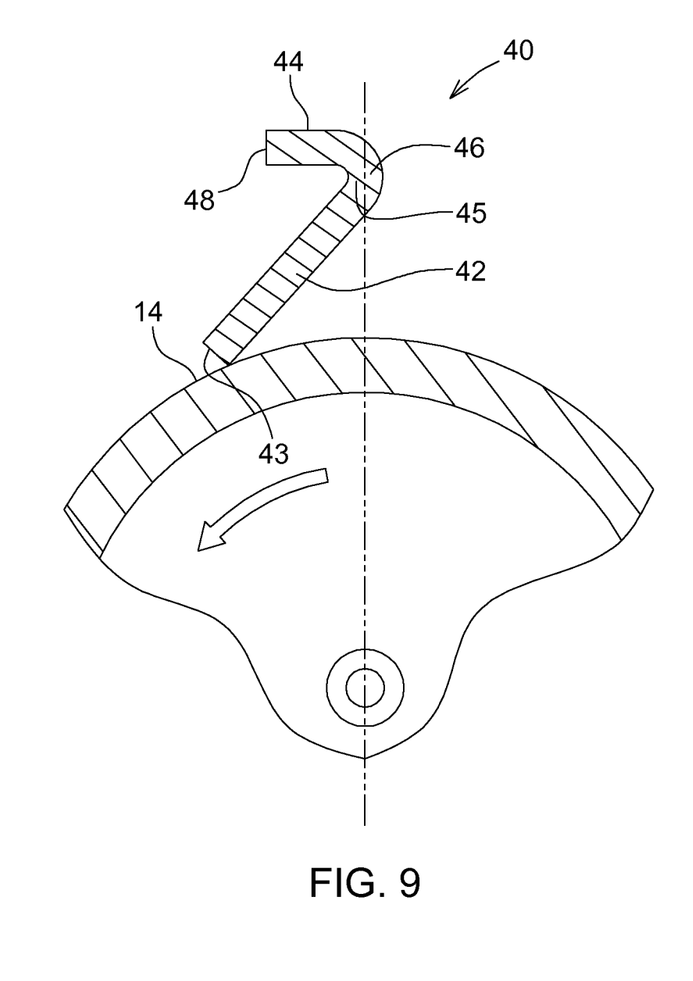
FIG. 9 is an enlarged sectional view of a seventh alternate embodiment of the paddle design shown in FIG. 2.

Referring now to FIG. 9, a seventh embodiment similar to the embodiment of FIG. 8 is shown except that the support portion 42 has an inner end 43 which is ahead of the outer end 45 of the support portion with respect to the direction of rotation of the body 14. The entire edge or lip portion 44 leads, i.e., it is forward or advanced with respect to the outer end 45 of support portion 42, with respect to the direction of rotation of body 14.

The result is an aggressive paddle element on a rotary conveying element to positively move crop from a cutting element to the conditioning elements. The paddle element is located between the cutting element and the conditioning element. The conditioning element serves as a rotary stripper to pull crop off the conveying element and into the conditioning element. The bent section of the outer member allows the conditioning element to pull crop over the trailing surface of the paddle without damaging the crop or impeding crop flow.

The paddle designs illustrated in FIGS. 2-7 provide more structural rigidity for the conveyer 10 than the designs illustrated in FIGS. 8 and 9. This additional structural rigidity is due to the first and second members 18 and 20 being welded to the body 14 at angularly spaced locations on the body 14. This gives more durability in adverse conditions such as rocky conditions. It also allows the conveying element to have a smaller size than if the paddle element had lesser structural integrity. A smaller conveying element improves crop flow as it does not have to elevate crop as far to get into the conditioner element. The leading edge of the second member extends beyond the first member in the direction of rotation to allow space to attach it to the first member by welding. Where conditions warrant, the paddle designs illustrated in FIGS. 8 and 9 will suffice.

The result is a structure which feeds crop from a cutterbar to a conditioner while allowing the crop to be accelerated by the conditioner without causing crop damage. This improved rotary crop conveying element leads to faster windrow drying. The improved paddle type element includes an aggressive edge or surface for uniformly delivering crop from a cutterbar to a conditioning element. This paddle design could be used on an overshot auger in front of a roll conditioner with a rotary cutterbar. It could also be used on other similar types of machines, such as any type of roll conditioner, as well as any impeller type conditioner, or a conventional sickle cutterbar, and on undershot augers.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

What is claimed is:

1. A material processing machine, comprising:
a rotary conveyer for delivering material to a material conditioner, the conveyer having a cylindrical rotatable body having a circumferential outer surface and being mounted for rotation about a central axis in a rotation direction for delivering material to the material conditioner; and
a paddle mounted on the body, the paddle, as considered in a vertical cross section extending perpendicular to the central axis, comprising:
a support portion defined solely by a straight first member having a radially outer end and a radially inner end, the inner end being attached to the body and the outer end being positioned in non-leading relationship to the inner end with respect to the rotation direction of the body; and
a second member including a straight outer part having a leading end and a trailing end, with respect to the rotation direction of the body, and being disposed at a right angle to a radial line extending from the central axis and passing through the radially outer end of the first member, and the straight outer part being fixed directly to the radially outer end of the first member and including an integral lip portion extending to the leading end of the straight outer part in leading relationship to the radially outer end of the first member with respect to the rotation direction of the body,
and the second member is bent to form an inner part having an outer end joined directly to the trailing end of the straight outer part,
the inner part having an inner end attached to the circumferential outer surface of said body at a location spaced in trailing relationship to the inner end of the first member, relative to the rotation direction of the body.

2. The material processing machine of claim 1, wherein:
the first member is disposed along the radial line which extends through the radially outer end of the first member from the central axis.

3. The material processing machine of claim 1, wherein:
the first member extends radially outwardly from the body along the radial line which extends through the radially outer end of the first member from the rotation axis of the body.

4. The material processing machine of claim 1, wherein:
a distance between the inner end of the first member and the inner end of the inner part of the second member is greater than a distance between the outer end of the first member and the outer end of the inner part of the second member.

5. The material processing machine of claim 1, wherein:
a radial distance between the body and the leading end of the outer part is greater than a radial distance between the body and the trailing end of the outer part.

6. The material processing machine of claim 1, wherein:
a radial distance between the circumferential outer surface of the body and the leading end of the outer part is substantially equal to a radial distance between the circumferential outer surface of the body and the trailing end of the outer part.

7. The material processing machine of claim 1, wherein:
a radial distance between the body and the leading end of the outer part is substantially equal to a radial distance between the body and the trailing end of the outer part; and
the inner part of the second member is substantially parallel to the first member.

8. The material processing machine of claim 1, wherein:
the outer end of the support portion is behind the inner end with respect the direction of rotation of the body.

9. The material processing machine of claim 1, wherein:
the second member includes a bent portion which is immediately adjacent to the outer end of the first member.

10. The material processing machine of claim 1, wherein:
the second member is curved from its inner end to the outer part.

11. A material processing machine, comprising:
a rotary conveyer for delivering material to a material conditioner, the conveyer having a cylindrical rotatable body having a circumferential outer surface and a central axis about which the body rotates in a direction of rotation for delivering material to the material conditioner; and
a paddle mounted on the body, the paddle, as considered in a vertical cross section taken perpendicular to the central axis, comprising:
a radially extending first member having a radially outer end and having a radially inner end, the inner end being attached to the circumferential surface of the body; and
a second member being defined by an angle member having straight first and second legs and being L-shaped in vertical cross section and arranged with the first leg extending perpendicular to a radial line extending from the central axis through the radially outer end of the first member, with the entire first leg being spaced radially outward from, the circumferential surface of the body, with the first leg having a leading end and a trailing end relative to the direction of rotation, and with the second leg having a radially outer end joined to the trailing end of the first leg and having a radially inner end which is attached to the circumferential surface of the body in trailing relationship to the inner end of the first member as considered relative to the direction of rotation of the body, and a location of the first leg trailing the leading end of the first leg and being fixed directly to the radially outer end of the first member so that a portion of the first leg extends in the direction of rotation from the radially outer end of the first member and defines a leading lip portion of the paddle.

12. The material processing machine of claim 11, wherein:
the outer end of the first member is in a non-leading position relative to the radially inner end of the first member with respect to the direction of rotation of the body.

13. The material processing machine of claim 11, wherein:
the first leg of the second member is perpendicular with respect to the first member.

14. The material processing machine of claim 11, wherein:
the second member includes a curved joint between the first and second legs.

15. The material processing machine of claim 11, wherein:
the radially outer end of the support portion trails the radially inner end of the support portion with respect to the direction of rotation of the body.

16. The material processing machine of claim 11, wherein:
a radial distance between the body and the leading end of the outer part is greater than a radial distance between the body and the trailing end of the outer part.

17. The material processing machine of claim 11, wherein:
the radially outer end of the first member is fixed to the first leg at a central location between the leading and trailing ends of the first leg of the second member.

* * * * *